3,391,147
ESTERS OF 1,2-DIHYDROQUINOLINE-N-CAR-
BOXYLIC ACIDS AND THIONE ACIDS
Bernard R. Belleau, Ottawa, Ontario, and Gilles Lacasse,
Verdun, Quebec, Canada, assignors, by mesne assign-
ments, to Bristol-Myers Company, New York, N.Y., a
corporation of Delaware
No Drawing. Continuation-in-part of application Ser. No.
495,724, Oct. 13, 1965. This application June 24, 1966,
Ser. No. 560,061
18 Claims. (Cl. 260—287)

ABSTRACT OF THE DISCLOSURE

Reduction of quinoline with LiAlH$_4$ gave 1,2-dihydro-quinoline (M.P. 62–66° C.) which was reacted, for example, in benzene with ethyl chloroformate in the presence of triethylamine to produce ethyl 1,2-dihydro-quinoline-N-carboxylate (B.P. 98–100° C./0.04 mm.) exhibiting analgesic, tranquilizing, sedative, spinal depressant and hypotensive properties. Similiar active esters were prepared from the corresponding thione acids.

This application is a continuation-in-part of our prior, copending application Ser. No. 495,724, filed Oct. 13, 1965, now abandoned.

This invention relates to certain novel analgesic, tranquilizing, sedative, depressant, anorexic and hypotensive agents and, more particularly, to certain esters of 1,2-dihydroquinoline-N-carboxylic acid, certain substituted 1,2-dihydroquinoline-N-carboxylic acids and the corresponding thione acids.

It was the objective of the present invention to provide nontoxic agents with pronounced pharmacological activity in the analgesic area, including the activities more specifically called tranquilizing, sedative and spinal depressant. It was another objective of the present invention to discover chemicals with these properties which would be well-absorbed upon oral administration to mammals. A third objective was to provide such activity in chemicals of a relatively simple structure in which pharmacological activity is usually completely lacking and in which there would not be present the complex structural features which often lead to toxic manifestations or to physiological activity of a type which is not desired and thus becomes an unwanted side-effect.

The objectives of the present invention have been achieved by the provision, according to the present invention, of the compounds of the formula

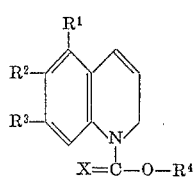

wherein R$^1$, R$^2$ and R$^3$ are the same or different and each represents hydrogen, chloro, bromo, iodo, fluoro, trifluoromethyl, (lower)alkyl, (lower)alkoxy, (lower)-alkylthio, (lower)alkylsulfonyl, hydroxy, (lower)alkanoyloxy, amino, alkoxycarbonylamino or a group of the formula

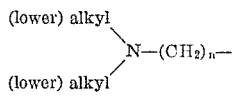

wherein $n$ is an integer from zero to three inclusive;
X represents oxygen or sulfur; and
R$^4$ represents hydrocarbonyl and particularly (lower)-alkyl, (lower)alkenyl, (lower)alkynyl, cycloalkyl containing from three to eight carbon atoms inclusive, halo(lower)alkyl other than α-haloalkyl or aralkyl and particularly a radical of the formula

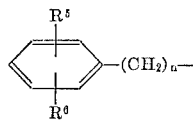

wherein $n$ is an integer from one to three inclusive and R$^5$ and R$^6$ each represent hydrogen, (lower)alkyl, (lower)alkoxy, chloro, bromo, iodo, fluoro or trifluoromethyl.

The term hydrocarbonyl as used herein means a monovalent nonaromatic radical containing only the elements carbon and hydrogen and containing less than eleven carbon atoms; examples of such a hydrocarbonyl group include ethyl, allyl, propargyl, cyclopropyl, cycloheptyl, cycloheptenyl, mono- or poly-methylcyclohexyl.

Two preferred embodiments of the present invention are the compounds of the formula

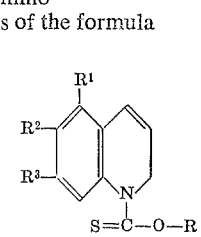

wherein
R represents (lower)alkyl and
R$^1$, R$^2$ and R$^3$ each represent hydrogen, (lower)alkyl, chloro, bromo, iodo, amino, alkoxycarbonylamino or di(lower)alkylamino and the compounds of the formula

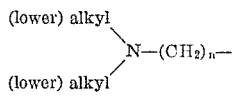

wherein
R represents (lower)alkyl and
R$^1$, R$^2$ and R$^3$ each represent hydrogen, (lower)alkyl, chloro, bromo, iodo, amino, alkoxycarbonylamino or di(lower)alkylamino.

Particularly preferred embodiments of the present invention are the hydrocarbonyl esters of 1,2-dihydroquinoline-N-carboxylic acid and especially the (lower)alkyl esters such as the methy, ethyl and n-propyl esters.

The compounds of the formula

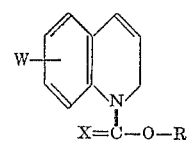

wherein W represents hydrogen, methyl, amino, alkoxycarbonylamino, di(lower)alkylamino or halogen and is attached to the 5, 6-, or 7-position, X represents oxygen or sulfur and R represents (lower)alkyl and the compounds of the formula

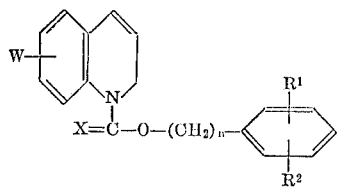

wherein
W represents methyl, halogen, amino, alkoxycarbonylamino or di(lower)alkylamino and is attached at the 5, 6-, or 7-position;
X represents oxygen or sulfur;
n is one, two or three; and
$R^1$ and $R^2$ each represent hydrogen, (lower)alkyl, (lower)alkoxy, chloro, bromo, iodo, fluoro or trifluoromethyl; and their nontoxic, pharmaceutically acceptable acid addition salts constitute a relatively limited, preferred embodiment of the present invention.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group, e.g. (lower)alkoxy, it refers to the alkyl portion of such group which is therefore as described above in connection with (lower) alkyl.

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower) alkanoyl includes acetyl, propionyl, butyryl, etc.; (lower) alkylsulfonyl includes methylsulfonyl, ethylsulfonyl, hexylsulfonyl, etc.; di(lower)alkylamino includes dimethylamino, diethylamino, ethylmethylamino, etc.

Most of the compounds of the present invention may be regarded as nonbasic amides and in any event do not form ordinary, stable acid addition salts. However, those which contain basic groups at the 5-, 6- or 7-position such as amino, di(lower)alkylamino or di(lower)alkylaminoalkyl groups, do form useful, nontoxic, pharmaceutically acceptable acid addition salts with both organic and inorganic acids, e.g., glycolic, citric, maleic, succinic, acetic, ascorbic, gluconic, palmitic, oleic, lactic, pantothenic, sulfuric, hydrochloric, nitric, phosphoric, hydrobromic, hydriodic and the like. When compared to the liquid nature of many of the compounds of the present invention, many of these salts are of particular value in pharmaceutical formulations because their solid, crystalline nature increases ease of handling.

The compounds of the present invention are prepared as exemplified below by conversion of the appropriate quinoline by the action of lithium aluminum hydride by the method of Braude et al., J. Chem. Soc. (London) 3249–3257 (1960) to the corresponding 1,2-dihydroquinoline which is then reacted with a chloroformate or a chlorothionformate, thus:

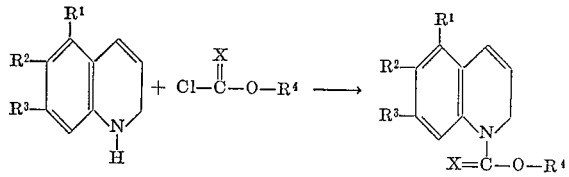

wherein X, $R^1$, $R^2$, $R^3$ and $R^4$ have the meanings set forth above. The lithium aluminum hydride may be replaced by di-isobutyl aluminum hydride [$(i-C_4H_9)_2AlH$; Chem. Abst. 53, 13151c].

The final reaction is conducted using at least an equimolar weight of the chloroformate at a temperature of about 0° to room temperature or even up to 50° C. and preferably in an inert solvent such as benzene. Before adding the chloroformate it is preferable to add at least an equimolar weight, and preferably several, of a tertiary amine such as triethylamine or pyridine to trap the hydrogen chloride formed in the reaction; alternatively, the tertiary amine can, if liquid, be used as the solvent itself.

Alternatively, the compounds of the present invention are prepared in the one-step process exemplified below by reducing the quinoline in the presence of the chloroformate. Thus, a mixture of these two reagents is added under dry conditions to a slurry, cooled to about 0° C. or less, of sodium borohydride in a dry solvent such as dimethylformamide.

In a preferred alternative process a solution of sodium borohydride in dry dimethylformamide at 25–30° C. is added with cooling and stirring to a solution of quinoline and chloroformate in a solvent such as dry dimethylformamide maintained at about −5° to 0° C. during the reaction.

The substituted quinolines used as starting materials in the synthesis of the compounds of the present invention are prepared by well-known methods, e.g. as summarized on pages 226–239 of volume IV, the Chemistry of the Carbon Compounds by Victor von Richter, edited by Richard Anschutz, translated from the twelfth German edition, Elsevier Publishing Co., Inc., New York, N. Y. (1947) and in Chapter 1, volume 4 of Heterocyclic Compounds, edited by Robert C. Elderfield, John Wiley and Sons, Inc., New York, N. Y. (1952) and on pages 584–627 of Chemistry of Carbon Compounds, edited by E. H. Rodd, volume IV, Part A, Heterocyclic Compounds, Elsevier Publishing Company, New York, N. Y. (1957).

The reagents of the formulae

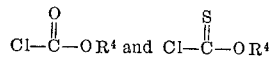

wherein $R^4$ has the meaning set out above, are prepared, for example, by reaction of phosgene or thiophosgene with the appropriate alcohol or haloalcohol as illustrated on pages 833, 886–899 of Chemistry of Carbon Compounds, edited by E. H. Rodd, Volume 1, Part B, Aliphatic Compounds, Elsevier Publishing Company, New York, N. Y. (1952). References to many such compounds are indexed in Chemical Abstracts as esters under "Formic acid, chloro-," "Formic acid, chlorothion-" and "Formic acid, chlorothio-."

The following examples will serve to illustrate the present invention without limiting it thereto. All temperatures are given in degrees centigrade.

EXAMPLE 1

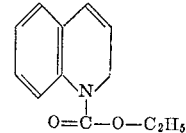

(A) 1,2-dihydroquinoline

To a boiling solution of 1.20 g. (157 mmoles) $LiAlH_4$ in 600 cc. anhydrous ether there was added dropwise a solution of 20.0 g. of quinoline in 100 cc. ether. The solution was refluxed for five hours and then allowed to stand at room temperature for 12 hours. The complex was destroyed by dropwise addition of 10 cc. of water and 5 cc. of 3N NaOH to the mixture at 0° C. with stirring. The precipitate was collected by filtration and washed with ether. The combined ethereal phase was dried over $MgSO_4$ and concentrated in vacuo to give a solid which was dissolved in 25 cc. anhydrous ether and transferred to a 50 cc. Claisen flask equipped with a 10 x 1 cm. Vigreux column. The ether was distilled off and the residue was distilled to yield 9 g. (45%) 1,2-dihydroquinoline, B.P. 110–115°/7 mm. which solidified at room temperature. Two recrystallizations from 10 cc. boiling petroleum ether (B.P. 66–75°) gave product of M.P. 62–66° C.

(B) Ethyl 1,2-dihydroquinoline-N-carboxylate

To 15.13 g. of 1,2-dihydroquinoline (115 mmoles) in 40 ml. of benzene and 16.0 cc. triethylamine (115 mmoles) was added dropwise, with stirring and cooling at 5° C., a solution of 22 ml. (230 mmoles) of ethyl chloroformate in 40 ml. of dry benzene. After stirring at room temperature for one hour, the triethylamine hydrochloride was filtered off, the filtrate was extracted with dilute aqueous hydrochloric acid and the benzene solution was then dried over anhydrous sodium sulfate. The solvent was removed at reduced pressure and the residue was fractionated in vacuo. Ethyl 1,2-dihydroquinoline-N-carboxylate was collected as the fraction boiling at 118–120° C. at 0.5 mm. (Yield 50–75%.) This product was distilled at 98–100°/0.04 mm.

Analysis.—Calc'd for $C_{12}H_{13}NO_2$: C, 70.92; H, 6.44; N, 6.89. Found: C, 72.57; H, 6.55; N, 6.62.

The U.V. spectrum showed the presence of a conjugated double bond at 233 m$\mu$ ($\epsilon$=27,770) in ethanol at a concentration of $7.1 \times 10^{-5}$ M.

The I.R. and NMR spectra were consistent with the assigned structure.

This compound exhibited useful analgesic, tranquilizing, sedative, spinal depressant and hypotensive properties in animals although the corresponding tetrahydro derivative, i.e., ethyl 1,2,3,4-tetrahydroquinoline-N-carboxylate, was found to be devoid of any significant pharmacological activity.

The ethyl 1,2-dihydroquinoline-N-carboxylate described above was tested for analgesic activity by the phenylquinone test of Sigmund et al., Proc. Soc. Expt'l. Biol. and Med., 95, 729 (1957) in which an analgesic reduces the induced writhing in the mice. At dosages of 150 mgm./kg. p.o. in mice given 50 minutes before the phenyl-p-quinone was injected, the reduction in induced writhing at the end of the first hour was found to be 65% for aspirin and 100% for this compound. A reduction of 80% was obtained using the much lower dose of 37.5 mgm./kg. and a reduction of 57% was obtained at a dose of 18.75 mgm./kg. This indicated that this compound is an analgesic agent.

Doses of this compound as low as 2 mgm./kg. p.o. in mice exhibited spinal depressant activity, indicating internuncial blocking, by the method of J. W. Bastian and S. A. Ridlon, Fed. Proc., 17(1), 1367 (1958).

The tranquilizing activity of this compound was indicated by its ability at a dose as low as 12.5 mgm./kg. p.o. in rats to block a conditioned response in the usual test in which the rats are trained to climb a pole when a buzzer is sounded in order to avoid a subsequent electric shock to their feet if they remain on the floor of the cage.

The $LD_{50}$ of this compound in mice was at least 180 mgm./kg. i.p., indicating that the toxic dose was far greater than the effective doses used above.

EXAMPLE 2

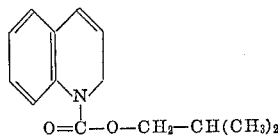

$O=\overset{|}{C}-O-CH_2-CH(CH_3)_2$

Isobutyl 1,2-dihydroquinoline-N-carboxylate

The procedure of Example 1 was followed replacing the ethyl chloroformate with isobutyl chloroformate.

From 13.1 g. of 1,2-dihydroquinoline, 10.2 g. of triethylamine and 10.8 g. of isobutyl chloroformate there was obtained 10.5 g. (45% yield) of isobutyl 1,2-dihydroquinoline-N-carboxylate, B.P. 115–120° C./0.05 mm.

Analysis.—Calc'd for $C_{14}H_{17}NO_2$: C, 72.70; H, 7.41; N, 6.06%. Found: C, 72.53; H, 7.34; N, 6.07.

EXAMPLE 3

Use in the procedure of Example 1, Part B, in place of the ethyl chloroformate of an equimolar weight of isopropyl chloroformate,
t-butyl chloroformate,
propargyl chloroformate,
allyl chloroformate,
methallyl chloroformate,
cyclopropyl chloroformate,
cyclohexyl chloroformate,
cycloheptenyl chloroformate,
benzyl chloroformate,
α-phenethyl chloroformate,
β-phenethyl chloroformate,
β-bromoethyl chloroformate,
β-iodoethyl chloroformate,
β-fluoroethyl chloroformate,
γ-chloropropyl chloroformate,
δ-chlorobutyl chloroformate,
p-methylbenzyl chloroformate,
o-methoxybenzyl chloroformate,
p-methoxybenzyl chloroformate,
o-chlorobenzyl chloroformate,
m-bromobenzyl chloroformate,
p-iodobenzyl chloroformate,
o-fluorobenzyl chloroformate,
p-trifluoromethylbenzyl chloroformate,
p-chlorophenylisopropyl chloroformate,
m-methoxybenzyl chloroformate,
o,p-dichlorobenzyl chloroformate,
o,o'-dimethoxybenzyl chloroformate, and
o,p-dimethylbenzyl chloroformate, respectively, produces isopropyl 1,2-dihydroquinoline-N-carboxylate,
t-butyl 1,2-dihydroquinoline-N-carboxylate,
propargyl 1,2-dihydroquinoline-N-carboxylate,
allyl 1,2-dihydroquinoline-N-carboxylate,
methallyl 1,2-dihydroquinoline-N-carboxylate,
cyclopropyl 1,2-dihydroquinoline-N-carboxylate,
cyclohexxyl 1,2-dihydroquinoline-N-carboxylate,
cycloheptenyl 1,2-dihydroquinoline-N-carboxylate,
benzyl 1,2-dihydroquinoline-N-carboxylate,
α-phenethyl 1,2-dihydroquinoline-N-carboxylate,
β-phenethyl 1,2-dihydroquinoline-N-carboxylate,
β-bromoethyl 1,2-dihydroquinoline-N-carboxylate,
β-iodoethyl 1,2-dihydroquinoline-N-carboxylate,
β-fluoroethyl 1,2-dihydroquinoline-N-carboxylate,
γ-chloropropyl 1,2-dihydroquinoline-N-carboxylate,
δ-chlorobutyl 1,2-dihydroquinoline-N-carboxylate,
p-methylbenzyl 1,2-dihydroquinoline-N-carboxylate,
o-methoxybenzyl 1,2-dihydroquinoline-N-carboxylate,
p-methoxybenzyl 1,2-dihydroquinoline-N-carboxylate,
o-chlorobenzyl 1,2-dihydroquinoline-N-carboxylate,
m-bromobenzyl 1,2-dihydroquinoline-N-carboxylate,
p-iodobenzyl 1,2-dihydroquinoline-N-carboxylate,
o-fluorobenzyl 1,2-dihydroquinoline-N-carboxylate,
p-trifluoromethylbenzyl 1,2-dihydroquinoline-N-carboxylate,
p-chlorophenylisopropyl 1,2-dihydroquinoline-N-carboxylate,
m-methoxybenzyl 1,2-dihydroquinoline-N-carboxylate,
o,p-dichlorobenzyl 1,2-dihydroquinoline-N-carboxylate,
o,o'-dimethoxybenzyl 1,2-dihydroquinoline-N-carboxylate, and
o,p-dimethylbenzyl 1,2-dihydroquinoline-N-carboxylate, respectively.

EXAMPLE 4

Use in the procedure of Example 1, Part B, in place of the ethyl chloroformate of an equimolar weight of
isopropyl chlorothionformate, t-butyl chlorothionformate,
propargyl chlorothionformate,
allyl chlorothionformate,
methallyl chlorothionformate,
cyclopropyl chlorothionformate,
cyclohexyl chlorothionformate,
cycloheptenyl chlorothionformate,
benzyl chlorothionformate,
α-phenethyl chlorothionformate,
β-phenethyl chlorothionformate,
β-bromoethyl chlorothionformate,
β-iodoethyl chlorothionformate,
β-fluoroethyl chlorothionformate,
γ-chloropropyl chlorothionformate,
δ-chlorobutyl chlorothionformate,
p-methylbenzyl chlorothionformate,
o-methoxybenzyl chlorothionformate,
p-methoxybenzyl chlorothionformate,
o-chlorobenzyl chlorothionformate,
m-bromobenzyl chlorothionformate,
p-iodobenzyl chlorothionformate,
o-fluorobenzyl chlorothionformate,
p-trifluoromethylbenzyl chlorothionformate,
p-chlorophenylisopropyl chlorothionformate,
m-methoxybenzyl chlorothionformate,
o,p-dichlorobenzyl chlorothionformate,
o,o'-dimethoxybenzyl chlorothionformate, and
o,p-dimethylbenzyl chlorothionformate, respectively, produces
isopropyl 1,2-dihydroquinoline-N-thioncarboxylate,
t-butyl 1,2-dihydroquinoline-N-thioncarboxylate,
propargyl 1,2-dihydroquinoline-N-thioncarboxylate,
allyl 1,2-dihydroquinoline-N-thioncarboxylate,
methallyl 1,2-dihydroquinoline-N-thioncarboxylate,
cyclopropyl 1,2-dihydroquinoline-N-thioncarboxylate,
cyclohexyl 1,2-dihydroquinoline-N-thioncarboxylate,
cycloheptenyl 1,2-dihydroquinoline-N-thioncarboxylate,
benzyl 1,2-dihydroquinoline-N-thioncarboxylate,
α-phenethyl 1,2-dihydroquinoline-N-thioncarboxylate,
β-phenethyl 1,2-dihydroquinoline-N-thioncarboxylate,
β-bromoethyl 1,2-dihydroquinoline-N-thioncarboxylate,
β-iodoethyl 1,2-dihydroquinoline-N-thioncarboxylate,
β-fluoroethyl 1,2-dihydroquinoline-N-thioncarboxylate,
γ-chloropropyl 1,2-dihydroquinoline-N-thioncarboxylate,
δ-chlorobutyl 1,2-dihydroquinoline-N-thioncarboxylate,
p-methylbenzyl 1,2-dihydroquinoline-N-thioncarboxylate,
o-methoxybenzyl 1,2-dihydroquinoline-N-thioncarboxylate,
p-methoxybenzyl 1,2-dihydroquinoline-N-thioncarboxylate,
o-chlorobenzyl 1,2-dihydroquinoline-N-thioncarboxylate,
m-bromobenzyl 1,2-dihydroquinoline-N-thioncarboxylate,
p-iodobenzyl 1,2-dihydroquinoline-N-thioncarboxylate,
o-fluorobenzyl 1,2-dihydroquinoline-N-thioncarboxylate,
p-trifluoromethylbenzyl 1,2-dihydroquinoline-N-thioncarboxylate,
p-chlorophenylisopropyl 1,2-dihydroquinoline-N-thioncarboxylate,
m-methoxybenzyl 1,2-dihydroquinoline-N-thioncarboxylate,
o,p-dichlorobenzyl 1,2-dihydroquinoline-N-thioncarboxylate,
o,o'-dimethoxybenzyl 1,2-dihydroquinoline-N-thioncarboxylate,
and
o,p-dimethylbenzyl, 1,2-dihydroquinoline-N-thioncarboxylate,
respectively.

To illustrate the nomenclature used herein, isopropyl chlorothionformate has the structure

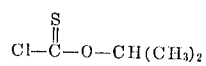

and isopropyl 1,2-dihydroquinoline-N-thioncarboxylate has the structure

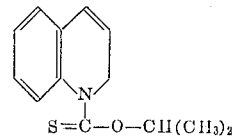

EXAMPLE 5

Use in the procedure of Example 1, Parts A and B, in place of the 20 g. quinoline, of an equimolar weight of
5-chloroquinoline,
6-bromoquinoline,
7-iodoquinoline,
7-fluoroquinoline,
5,7-dichloroquinoline,
5,7-dimethylquinoline,
5-methylquinoline,
7-methylquinoline,
6-chloroquinoline,
7-bromoquinoline,
6-iodoquinoline,
6-methylquinoline,
6-ethylquinoline,
5-chloro-6-methylquinoline,
6-chloro-5-methylquinoline,
7-chloro-6-methylquinoline,
6-cyanoquinoline,
5-bromoquinoline,
5-trifluoromethylquinoline,
6-trifluoromethylquinoline,
6-methyl-7-trifluoromethylquinoline,
5-methoxyquinoline,
5-acetoxyquinoline,
7-dimethylaminoquinoline, and
7-diethylaminoquinoline, respectively,
produces
ethyl 5-chloro-1,2-dihydroquinoline-N-carboxylate,
ethyl 6-bromo-1,2-dihydroquinoline-N-carboxylate,
ethyl 7-iodo-1,2-dihydroquinoline-N-carboxylate,
ethyl 7-fluoro-1,2-dihydroquinoline-N-carboxylate,
ethyl 5,7-dichloro-1,2-dihydroquinoline-N-carboxylate,
ethyl 5,7-dimethyl-1,2-dihydroquinoline-N-carboxylate,
ethyl 5-methyl-1,2-dihydroquinoline-N-carboxylate,
ethyl 7-methyl-1,2-dihydroquinoline-N-carboxylate,
ethyl 6-chloro-1,2-dihydroquinoline-N-carboxylate,
ethyl 7-bromo-1,2-dihydroquinoline-N-carboxylate,
ethyl 6-iodo-1,2-dihydroquinoline-N-carboxylate,
ethyl 6-methyl-1,2-dihydroquinoline-N-carboxylate,
ethyl 6-ethyl-1,2-dihydroquinoline-N-carboxylate,
ethyl 5-chloro-6-methyl-1,2-dihydroquinoline-N-carboxylate,
ethyl 6-chloro-5-methyl-1,2-dihydroquinoline-N-carboxylate,
ethyl 7-chloro-6-methyl-1,2-dihydroquinoline-N-carboxylate,
ethyl 6-cyano-1,2-dihydroquinoline-N-carboxylate,
ethyl 5-bromo-1,2-dihydroquinoline-N-carboxylate,
ethyl 5-trifluoromethyl-1,2-dihydroquinoline-N-carboxylate,
ethyl 6-trifluoromethyl-1,2-dihydroquinoline-N-carboxylate,
ethyl 6-methyl-7-trifluoromethyl-1,2-dihydroquinoline-N-carboxylate,
ethyl 5-methoxy-1,2-dihydroquinoline-N-carboxylate,
ethyl 5-acetoxy-1,2-dihydroquinoline-N-carboxylate,
ethyl 7-dimethylamino-1,2-dihydroquinoline-N-carboxylate, and
ethyl 7-diethylamino-1,2-dihydroquinoline-N-carboxylate, respectively.

Ethyl esters of the corresponding 1,2-dihydroquinoline-N-carboxylic thion-acids are produced by substituting an equimolar weight of ethyl chlorothionformate for the ethyl chloroformate used above.

EXAMPLE 6

[Structure: 1,2-dihydroquinoline with N—C(=O)—O—CH₂CH₂Cl substituent]

To 9.1 g. (70 mmoles) 1,2-dihydroquinoline in 55 cc. benzene was added 10 cc. (75 mmoles) triethylamine. The solution was cooled to 10° C. and 10.2 g. (70 mmoles) β-chloroethyl chloroformate $$(Cl-\overset{O}{\underset{\|}{C}}-O-CH_2CH_2Cl)$$

in 20 cc. benzene were added dropwise with stirring and cooling. After five days, standing at room temperature the reaction mixture was washed with 150 cc. 3 N HCl and the organic phase was decanted and washed again with 150 cc. 10% aqueous NaHCO₃. The organic phase was separated and dried over Na₂SO₄ and the solvent was removed by vacuum distillation. The residue was distilled and then redistilled at 130° C./0.05 mm. to give 7.0 g. β-chloroethyl 1,2-dihydroquinoline-N-carboxylate.

*Analysis.*—Calc'd for $C_{12}H_{12}NO_2Cl$: C, 60.64; H, 5.09; N, 5.89. Found: C, 60.72; H, 5.63; N, 6.12.

A repeat experiment using pyridine in place of triethylamine gave the same product of B.P. 120–122° C./0.04 mm.

EXAMPLE 7

[Structure: 1,2-dihydroquinoline with N—C(=O)—OCH₃ substituent]

Methyl chloroformate $$(Cl-\overset{O}{\underset{\|}{C}}-OCH_3;\ 9.45\ g.,\ 101\ mmoles)$$

dissolved in 25 cc. benzene was added dropwise to a solution in 100 c. benzene of 101 mmoles 1,2-dihydroquinoline and 105 mmoles pyridine. The solution was stirred with cooling for 15 minutes after which it was allowed to stand for 19 hours. The mixture was shaken with 50 cc. 3 N HCl and the organic phase was separated, washed with three 50 cc. portions of distilled water until neutral, dried over Na₂SO₄ and fractionally distilled in vacuo to give 3.5 g. methyl 1,2-dihydroquinoline-N-carboxylate, B.P. 86–88° C./0.04 mm.

*Analysis.*—Calc'd for $C_{11}H_{11}NO_2$: C, 69.82; H, 5.86; N, 7.40. Found: C, 67.94; H, 6.09; N, 7.54.

EXAMPLE 8

[Structure: 1,2-dihydroquinoline with N—C(=O)—O—CH₂CH₂CH₂CH₃ substituent]

A solution of 9.6 g. (70 mmoles) n-butyl chloroformate in 25 cc. benzene was added dropwise to a cooled and stirred solution of 70 mmoles 1,2-dihydroquinoline and 75 mmoles pyridine in 75 cc. benzene. The solution was allowed to stand at room temperature for 21 hours after which it was washed with 50 cc. 3 N HCl and the aqueous phase was decanted. The organic phase was washed with three 50 cc. portions of water until neutral, dried over Na₂SO₄ and fractionally distilled in vacuo to give 4.0 g. n-butyl 1,2-dihydroquinoline-N-carboxylate, B.P. 118–120° C./0.05 mm.

*Analysis.*—Calc'd for $C_{14}H_{17}NO_2$: C, 72.70; H, 7.41; N, 6.06. Found: C, 72.34; H, 7.88; N, 6.25.

EXAMPLE 9

Preparation of 1-carbethoxy-1,2-dihydroquinoline

EQUATION

[Equation: quinoline + Cl—CO₂Et →(NaBH₄, H₂O, DMF)→ 1,2-dihydroquinoline with N—CO₂Et substituent]

PROCEDURE

Ethyl chloroformate (97.6 g.; 0.9 mole) in a 200 ml. pressure equalizing dropping funnel fitted with a CaCl₂ tube is added dropwise through the top of a 10″ straight-bore condenser to a magnetically stirred and cooled (0 to 5°) solution of quinoline (77.4 g.; 0.6 mole) in 100 ml. of dimethylformamide (reagent grade) in a one-necked 250 ml. round-bottom flask. (Note 1.)

See Notes below.

A 1-liter 3-necked round-bottom flask is equipped with a mechanical stirrer, low-temperature thermometer, and a 10″ straight bore condenser at the top of which is set a 200 ml. pressure equalizing dropping funnel with a CaCl₂ tube. The flask is set in a Dry Ice-acetone bath. The dropping funnel is charged with the cold solution prepared above and to the flask is added a slurry of sodium borohydride (15.3 g.; 0.4 mole) in 150 ml. of dimethylformamide. The stirrer is started and the slurry is cooled to below 0° (Note 2).

See Notes below.

The ethyl chloroformate-quinoline solution is then added dropwise over 1½ hours. After stirring an additional 1½ hours water (50 ml) is added dropwise over ½ hour followed by conc. HCl (20 mls.). (Note 3.)

See Notes below.

The mixture is slowly warmed to ambient temperature (20–25° C.) and then diluted with 1 l. of water. This is extracted with 3× 150 ml. of Et₂O and the combined ether extracts are washed with 3× 250 mls. of 9% HCl, followed by a washing with 100 ml. of water. (Note 4.) The organic layer is dried over magnesium sulfate, filtered, and the filtrate evaporated leaving 89 g. of an oil (73% crude yield). (Note 5.) Distillation under reduced pressure produces 74.2 g. (61%) of pure colorless product, B.P. 108–114° C., 0.08 to 0.05 mm. Hg. (Note 6.)

See Notes below.

NOTES (1) All flasks and reagents should be relatively dry.

(2) The temperature is kept below 0° C., but fluctuates between −20° and −50° C. over most of the reaction. Dry-Ice is added to the acetone bath periodically to keep the bath below 0° C.

(3) It is important to carry out the hydrolysis below 0° C. Hydrogen gas is evolved.

(4) Unreacted quinoline may be recovered by neutralizing the acid washings and extracting with ether.

(5) I.R. analysis shows that this material is pure.

(6) A small amount of an unidentified solid is collected in the 1st fraction. Silicone oil is added to the distillation if foaming is excessive.

EXAMPLE 10

I. EQUATIONS

[Equation: quinoline (129.1) + CH₃CH₂—O—C(=O)—Cl (108.53) →(DMF)→ N-acylquinolinium chloride with N⁺—C(=O)—OCH₂CH₃ and Cl⁻]

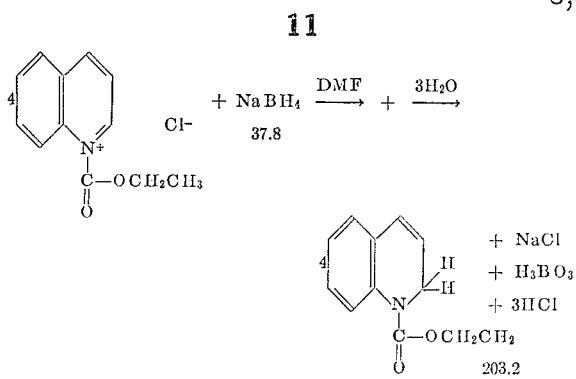

II. SAFETY

Quinoline has a severe acute systemic toxicity both by ingestion and by inhalation. The chronic systemic toxicity by ingestion and inhalation is moderate. The local acute and chronic toxicities are unknown. It may produce retinitis without causing opacity of the lens. Decomposition by heat produces toxic nitrogen oxides.

Ethyl chloroformate has a severe acute local toxicity as an irritant and by ingestion or inhalation. It is a lachrymator. Decomposition by heat produces highly toxic chloride fumes. It will react with water or steam to produce toxic and corrosive fumes. It can react vigorously with oxidizing materials.

Sodium borohydride has a severe acute local and systemic toxicity by inhalation and locally as an irritant. It also has a severe chronic local and systemic toxicity by inhalation. It emits toxic fumes on decomposition by heat. It will react with water or steam to produce hydrogen.

III. MATERIALS

Quinoline (7.75 moles) _____ g__ 1000
Ethyl chloroformate (11.65 moles) _____ g__ 1265
Sodium borohydride, $NaBH_4$ (5.16 moles) ____ g__ 198
HCl (conc.) _____ ml__ 260
Ice _____ g__ 6250
Dimethylformamide (DMF) (dried) _____ ml__ 3300
Methyl isobutyl ketone (MIBK) _____ ml__ 6000
3 N HCl _____ ml__ 3000
Saturated NaCl solution $MgSO_4$ anhydrous __ ml__ 3000

IV. PROCEDURE (1) Add 198 g. of $NaBH_4$ with stirring to 2000 ml. of dry DMF at 25–30° C. There is a heat effect. Control the temperature at 25–30° and stir until the solid has dissolved to a cloudy solution. Do not cool this below 25° C. to avoid formation of a solid solvate.

(2) Prepare a solution of 1000 g. of quinoline (approximately 950 ml.) in 1300 ml. of dry DMF.

(3) With stirring and cooling add 1265 g. (1115 ml. approx.) of ethyl chloroformate over a 30 minute period to the quinoline solution at −5° to 0° C.

(4) With cooling and stirring add the $NaBH_4$ solution to the quinoline salt solution at a rate such that the temperature of the reaction is held at −5° to 0° C. When the addition is completed continue stirring at the same temperature or lower for a time equal to that of the addition.

(5) Add 260 ml. of concentrated hydrochloric acid to 6250 ml. of water and cool it to 0° C.

(6) Add 6250 g. of ice to the cold HCl solution and stir.

(7) Add the reaction mixture to the stirring ice acid solution and keep the temperature at 0° C. or below. There will be some foaming as gas is released from the reaction of excess $NaBH_4$, etc. Stir this until all the gas production has stopped and the ice has melted. Warm gradually to 20–25° C. It may take 2 hours.

(8) Extract the reaction mixture with two 3000 ml. portions of MIBK and combine the MIBK extracts.

(9) Wash the combined MIBK extract with one 3000 ml. portion of 3 N hydrochloric acid. Prepare the acid by diluting 750 ml. of conc. HCl to 3000 ml. with cold water.

(10) Wash the MIBK extract with one 3000 ml. portion of saturated NaCl solution.

(11) Dry the MIBK solution over anhydrous $MgSO_4$.

(12) Filter the MIBK solution and strip off all of the MIBK at reduced pressure. The yield of crude product should be approximately 1350 g. (85%).

(13) Distill the crude product under high vacuum and collect two fractions. The first fraction taken up to 112°/0.4 mm. contains mostly the desired product and amounts to a yield of approximately 90 g. or 5.7%. The second fraction is the product and is clear and colorless. The yield is about 990 g. 63.0%. B.P. 112–115° C. at 0.4 mm.

V. PHARMACOLOGY

This product is a highly interesting tranquilizer, similar in some ways to chlorpromazine (CPZ) and in other ways to reserpine. This comparison is summarized below:

| Activity | This Product | CPZ | Reserpine |
|---|---|---|---|
| Sedation | + | + | + |
| Hypnotic | + | + | − |
| Muscle relaxant | − | + | − |
| Conditioned response | − | + | − |
| Catalepsy | + | + | ± |
| Monkey tranquilizer | + | + | + |
| Hypothermia | + | + | + |
| Anti-emetic | − | + | + |
| Amphetamine antagonism | − | + | + |
| Effect on convulsants | + | + | + |
| Potentiation of barbiturates, alcohol | (1) | (2) | (1) |
| Adrenergic block | + | + | + |
| Hypotensive | + | + | − |
| Reversal by MAOI | − | − | + |

[1] Potentiates.
[2] Blocks.

In most tests, it is slightly more active on a weight basis than CPZ, but less active than reserpine. The duration of action is some 24 hours in animals, and it has shown activity in all species used, i.e. mice, rats, guinea pigs, cats, dogs and monkeys.

EXAMPLE 11

Quinoline (48 g.) was added dropwise to 550 cc. of a 12.5% solution of di-isobutyl aluminum hydride in equal parts of n-hexane and diethyl ether under nitrogen at 5° C. As the quinoline was added the deep-red color disappeared. After two hours at 5° C. 100 cc. of 20% by weight aqueous sodium hydroxide was added slowly (over one hour) with cooling and stirring at 5–10° C. under nitrogen. The ether solution was decanted and dried over $Na_2SO_4$ and the solvent was removed in vacuo to yield 47 g. (95%) crystalline 1,2-dihydroquinoline which was used immediately in the next reaction.

1,2-dihydroquinoline (13.1 g., 0.1 mole) was dissolved in 30 cc. $CHCl_3$ (freed of oxygen by passing nitrogen through it) and cooled to −20° C. in a mixture of solid carbon dioxide and acetone; to this solution there was added 10 cc. triethylamine and 24 g. ethyl chloroformate. The mixture was allowed to reach room temperature over a period of one hour and then allowed to stand for 18 hours. The mixture was washed with 30 cc. 3 N HCl, and three times with 30 cc. water until neutral, dried over $Na_2SO_4$ and distilled to yield 11.0 g. ethyl 1,2-dihydroquinoline-N-carboxylate, B.P. 105–107° C./0.04 mm.

This compound was found to be sedative in monkeys in doses down to 2.5 mgm./kg. orally. The sedation was characterized by a loss of aggressiveness and fear, catatonia, and a long duration of action (approximately 48 hours). Agggressive monkeys became easy to handle without gloves.

EXAMPLE 12

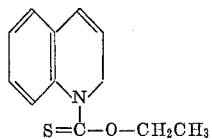

1,2-dihydroquinoline (5.3 g.) was reacted with 2.5 g. ethyl chlorothioformate in 50 cc. $CHCl_3$ at −10° C. After standing at 25° C. for 5 hours the solution was washed with 50 cc. 3 N HCl, then with water until neutral, dried over $MgSO_4$ and evaporated to leave 3.77 g. (85%) ethyl 1,2-dihydroquinoline-N-thioncarboxylate, B.P. 140–144°/0.1 mm., M.P. 52–54° C.

This compound was active as a depressant at 10 mgm./kg.

EXAMPLE 13

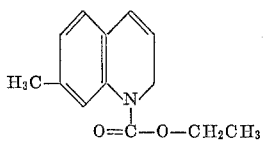

7-methylquinoline (14.3 g.) was added dropwise to 120 cc. of a 12% solution of di-isobutyl aluminum hydride in equal parts of n-hexane and diethyl ether under nitrogen and the mixture was held at 20° C. under nitrogen for 14 hours. Then 100 cc. 20% aqueous NaOH was carefully added with vigorous stirring and cooling to 5° C. The ether layer was separated, dried over $MgSO_4$ and evaporated in vacuo to yield 14.5 g. 1,2-dihydro-7-methylquinoline, which was dissolved in 100 cc. $CHCl_3$ and cooled to −20° C. To that solution there was added 20 cc. ethyl chloroformate. After 30 minutes 15 cc. triethylamine was added dropwise with cooling. After standing for one day at room temperature, the product was isolated as in Example 12 to yield 14.0 g. ethyl 1,2-dihydro-7-methylquinoline-N-carboxylate, B.P. 108–110° C./0.05 mm.

*Analysis.*—Calc'd for $C_{13}H_{15}NO_2$: C, 71.85; H, 6.96; N, 6.45. Found: C, 72.19; H, 6.81; N, 6.53.

This compound was active as a depressant at 10 mgm./kg.

EXAMPLE 14

The 7-methylquinoline of Example 13 is replaced in the procedures of that example by an equimolar weight of
6-chloroquinoline,
6-methylquinoline and
6-methoxyquinoline, respectively, to produce
ethyl 1,2-dihydro-6-chloroquinoline-N-carboxylate (B.P. 133–135° C./0.1 mm.),
ethyl 1,2-dihydro-6-methylquinoline-N-carboxylate (B.P. 118–120° C./0.15 mm.) and
ethyl 1,2-dihydro-6-methoxyquinoline-N-carboxylate (B.P. 135–137° C./0.05 mm.), respectively.

Each of these compounds was found to be active as a depressant.

EXAMPLE 15

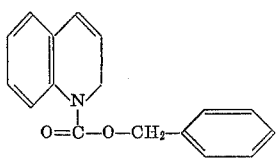

To 6.5 g. (50 mmoles) 1,2-dihydroquinoline in 100 cc. $CHCl_3$ at −20° C. there was added 17.1 g. (100 mmoles) benzyl chloroformate with stirring. After standing 30 minutes triethylamine (6.0 cc., 50 mmoles) was added with cooling. After 24 hours standing the organic phase was washed with 50 cc. 3 N HCl, dried over $MgSO_4$ and evaporated to leave 9.0 g. benzyl 1,2-dihydroquinoline-N-carboxylate, B.P. 174–176° C./0.1 mm.

*Analysis.*—Calc'd for $C_{17}H_{15}O_2N$: C, 76.96; H, 5.70. Found: C, 77.10; H, 5.97.

EXAMPLE 16

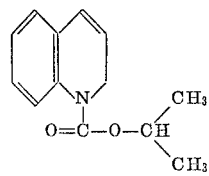

Isopropyl chloroformate (150 mmoles) was prepared by reacting 9.0 g. (150 mmoles) isopropyl alcohol and 120 cc. 12.5% phosgene in benzene (150 mmoles) at 5° C. for one hour and then evaporating the solvent and HCl in vacuo at 0° C.

To 13.1 g. (100 mmoles) 1,2-dihydroquinoline and 12.0 cc. (100 mmoles) triethylamine in 100 cc. $CHCl_3$ at −20° C. were added about 150 mmoles of isopropyl chloroformate dropwise with stirring and cooling. After 60 hours standing at room temperature the basic solution was acidified with 100 cc. 3 N HCl and the acid phase decanted. The chloroform phase was washed with 100 cc. distilled water and then with bicarbonate until pH 8 was reached. The organic phase was dried over $MgSO_4$, filtered, evaporated in vacuo and the residue distilled to yield 3.5 g. isopropyl 1,2-dihydroquinoline-N-carboxylate, B.P. 82–84° C./0.001 mm., and redistilling at 80–82° C./0.001 mm.

*Analysis.*—Calc'd for $C_{13}H_{15}O_2N$: C, 71.86; H, 6.96. Found: C, 72.32; H, 6.95.

EXAMPLE 17

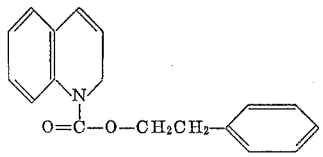

β-Phenethyl chloroformate (150 mmoles) was prepared by reacting 18.0 g. (150 mmoles) β-phenethyl alcohol and 120 cc. 12.5% phosgene in benzene (150 mmoles) at 5° C. for one hour and evaporating the solvent and HCl in vacuo on the steam bath (90° C.).

To 13.1 g. (100 mmoles) 1,2-dihydroquinoline and 12.0 cc. triethylamine in 100 cc. $CHCl_3$ at −20° C. were added dropwise with stirring and cooling about 150 mmoles β-phenethyl chloroformate. After standing 65 hours at room temperature the slightly basic solution was acidified with 100 cc. 3 N HCl and the organic phase was collected by decantation, washed once with 100 cc. distilled water and then with 100 cc. dilute bicarbonate until neutral. The residue was distilled to yield 15.0 g. β-phenethyl 1,2-dihydroquinoline-N-carboxylate, B.P. 154–158° C./0.005 mm. which was redistilled to yield 14.0 g. product, B.P. 154–156° C./0.005 mm.

*Analysis.*—Calc'd for $C_{18}H_{17}O_2N$: C, 77.39; H, 6.13. Found: C, 77.12; H, 6.40.

EXAMPLE 18

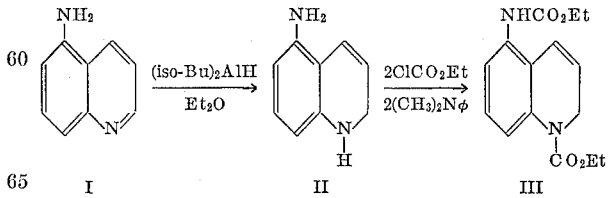

10.4 g. I (72 mmoles: prepared by the hydrazine-Raney nickel reduction of 5-nitro-quinoline) were added portionwise to 75 mmoles of di-isobutyl aluminum hydride in 150 cc. 1:2 n-hexane: diethyl ether at 5° C. under nitrogen with stirring. After the addition, the solution stood at 25° C. for 6 hours under nitrogen. It was carefully destroyed by adding excess 20% KOH at −10° C. with vigorous stirring. The organic phase was decanted and dried over $MgSO_4$. The $MgSO_4$ was filtered, washed with 100 cc. dry ether and the filtrate evaporated. Yield 4.3 g. II (40%). The 5 amino-1,2-dihydroquinoline (II) was dissolved in 50 cc. CHCl$_3$, 7.5 cc. (60 mmoles) N,N-dimethylaniline added, the solution cooled to —10° C. and 7.5 cc. ethyl chloroformate added dropwise with stirring and cooling. After standing at 25° C. for 3 hours a slight excess of 3 N HCl was added, the organic phase decanted and washed with water until neutral. The CHCl$_3$ extracts were dried over MgSO$_4$, filtered and evaporated. Yield 6.0 g. ethyl 5-ethoxycarbonylamino-1,2-dihydroquinoline-N-carboxylate (III).

Analysis.—Calc'd for C$_{15}$H$_{18}$N$_2$O$_4$: C, 62.05; H, 6.25; N, 9.65. Found: C, 61.74; H, 6.23; N, 10.08.

EXAMPLE 19

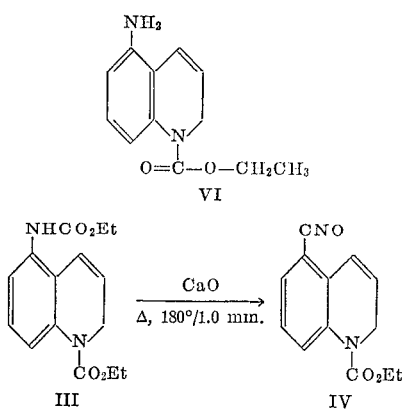

III was distilled slowly under vacuum over a period of 2 hours at 180–185° C./0.1 mm. to yield 2.0 g. of distillate. V.P.C. (vapor phase chromatography) (6' x ¼" SE–30 on glass beads, 220°, 60 cc. He min.$^{-1}$) showed that the distillate consisted of approximately 30% IV and 70% III. Yield of IV as isocyanate (10%). I.R. 4742 c. of the distillate contained a strong isocyanate band at 2260 cm.$^{-1}$.

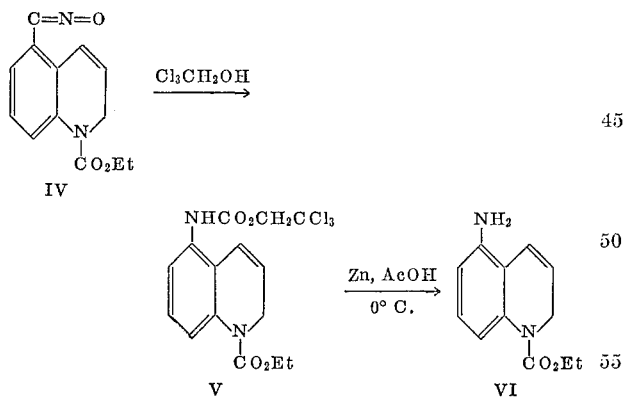

IV was dissolved in 5.0 cc. trichloroethanol, allowed to stand 10 hours and evaporated at 60° C. under vacuum. The residue V (still containing a major part of III) was dissolved in 10.0 cc. 90% aqueous acetic acid, cooled to 0° C. and stirred for 3½ hours with 2.0 g. zinc dust. After filtering off the zinc, the solution was diluted to 50.0 cc. with water. The acidic solution was extracted with 50.0 cc. ether to remove any neutral material, then Na$_2$CO$_3$ was added with stirring until some Zn(OH)$_2$ started to precipitate (pH8) when it was extracted with 2×50 cc. of benzene. The resulting emulsion was filtered under vacuum, the benzene phase dried and evaporated. Yield 300 mg. VI (35%); U.V. max at 238 mμ ε 18,700 in ethanol. HCl salt (prepared by adding the calculated amount of gaseous HCl in dry ether) M.P. 210° C. with decomposition.

Analysis.—Calc'd for C$_{12}$H$_{14}$N$_2$O$_2$·HCl: C, 56.58; H, 5.93; N, 11.00. Found: C, 56.60; H, 6.22; N, 1078.

EXAMPLE 20

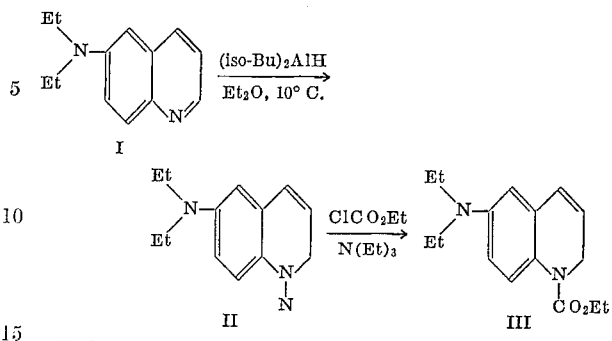

I (cf. C.A., 14, 3065) is reduced by the method of Example 1A and the product is reacted with ethyl chloroformate to give III which is converted to a white, solid, water-soluble hydrochloride by treatment with one equivalent of hydrogen chloride in dry ether.

EXAMPLE 21

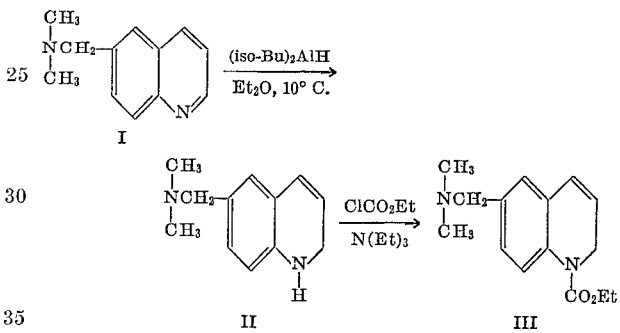

I (cf. C.A., 54, 8816a) is reduced by the method of Example 1A and the product is reacted with ethyl chloroformate to give III which is converted to acid addition salts by treatment with one equivalent of the desired acid, e.g. phosphoric acid, citric acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. The compounds of the formula

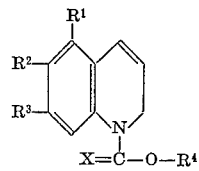

wherein two of the groups R$^1$, R$^2$ and R$^3$ are hydrogen and the other is hydrogen, chloro, bromo, iodo, fluoro, trifluoromethyl, methyl, ethyl, methoxy, ethoxy, methylthio, ethylthio, methylsulfonyl hydroxy, acetoxy, amino or a group of the formula

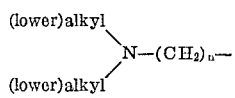

wherein n is an integer from zero to three inclusive and each (lower) alkyl group is methyl or ethyl; or ethyl;

X is oxygen or sulfur, and

R$^4$ is (lower)alkyl, (lower)alkenyl, (lower)alkynyl, cycloalkyl having from three to eight carbon atoms inclusive, halo(lower)alkyl other than α-haloalkyl or a radical of the formula

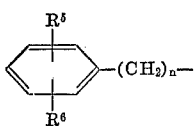

wherein $n$ is an integer from one to three inclusive and $R^5$ and $R^6$ each are hydrogen, (lower)alkyl, (lower)alkoxy, chloro, bromo, iodo, fluoro or trifluoromethyl; and their nontoxic pharmaceutically acceptable acid addition salts.

2. The compounds of claim 1 having the formula

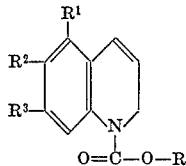

wherein R represents (lower)alkyl and two of the groups $R^1$, $R^2$ and $R^3$ are hydrogen and the other is hydrogen, methyl, ethyl, chloro, bromo, iodo, amino, dimethylamino or diethylamino; and their nontoxic pharmaceutically acceptable acid addition salts.

3. The compounds of claim 1 having the formula

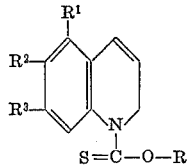

wherein R represents (lower)alkyl and two of the groups $R^1$, $R^2$ and $R^3$ are hydrogen and the other is hydrogen, methyl, ethyl, chloro, bromo, iodo, amino, dimethylamino or diethylamino; and their nontoxic, pharmaceutically acceptable acid addition salts.

4. The compounds of claim 1 having the formula

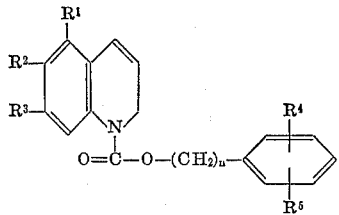

wherein two of the groups $R^1$, $R^2$ and $R^3$ are hydrogen and the other is hydrogen, methyl, ethyl, chloro, bromo, iodo, amino, dimethylamino or diethylamino, $n$ is one, two or three, and $R^4$ and $R^5$ each are hydrogen, (lower)alkyl, (lower)alkoxy, chloro, bromo, iodo, fluoro or trifluoromethyl; and their nontoxic, pharmaceutically acceptable acid addition salts.

5. The compounds of claim 1 having the formula

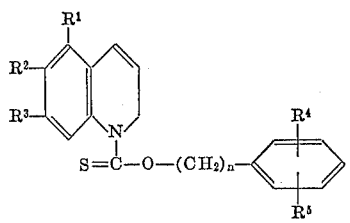

wherein two of the groups $R^1$, $R^2$ and $R^3$ are hydrogen and the other is hydrogen, methyl, ethyl, chloro, bromo, iodo, amino, dimethylamino or diethylamino, $n$ is one, two or three, and $R^4$ and $R^5$ each are hydrogen, (lower)alkyl, (lower)alkoxy, chloro, bromo, iodo, fluoro or trifluoromethyl;

and their nontoxic, pharmaceutically acceptable acid addition salts.

6. The compounds of claim 1 which are (lower)alkyl, (lower)alkenyl or (lower)alkynyl esters of 1,2-dihydroquinoline-N-carboxylic acid.

7. The compounds of claim 1 which are (lower)alkyl, (lower)alkenyl or (lower)alkynyl thionesters of 1,2-dihydroquinoline-N-carboxylic acid.

8. The compounds of claim 1 having the formula

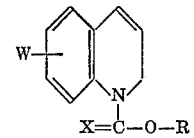

wherein W is methyl, halogen, amino, dimethylamino or diethylamino and is attacked at the 5-, 6-, or 7-position, R is (lower)alkyl and X is oxygen or sulfur; and their nontoxic, pharmaceutically acceptable acid addition salts.

9. The compounds of claim 1 having the formula

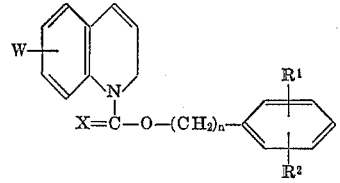

wherein W is methyl, halogen, amino, dimethylamino or diethylamino and is attached at the 5-, 6-, or 7-position;

X is oxygen or sulfur;

$n$ is one, two or three; and $R^1$ and $R^2$ each are hydrogen, (lower)alkyl, (lower)alkoxy, chloro, bromo, iodo, fluoro or trifluoromethyl; and their nontoxic pharmaceutically acceptable acid addition salts.

10. The compounds of claim 1 having the formula

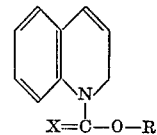

wherein R is (lower)alkyl and X is oxygen or sulfur.

11. The compounds of claim 1 having the formula

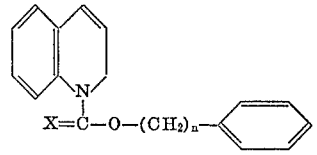

wherein X is oxygen or sulfur and $n$ is one, two or three.

12. The compound of claim 1 having the formula

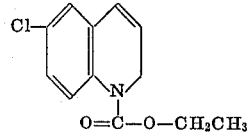

13. The compound of claim 1 having the formula

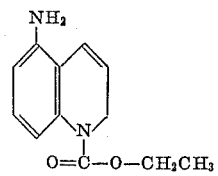

and its nontoxic pharmaceutically acceptable acid addition salts.

14. The compound of claim 1 having the formula
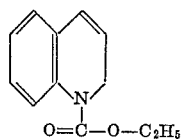
15. The compound of claim 1 having the formula
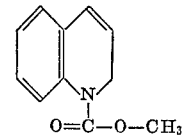
16. The compound of claim 1 having the formula
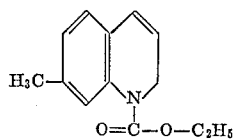
17. The compound of claim 1 having the formula
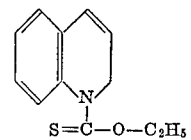
18. The compound of claim 1 having the formula
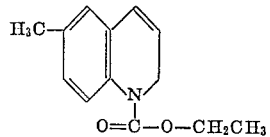
References Cited
UNITED STATES PATENTS
| | | | |
|---|---|---|---|
| 2,623,046 | 12/1952 | Cusic | 260—247.2 |
| 2,650,919 | 9/1953 | Cusic | 260—243 |
NICHOLAS S. RIZZO, *Primary Examiner.*
D. G. DAUS, *Assistant Examiner.*